Aug. 7, 1923.
T. E. MALLESON
FISHING REEL
Filed May 9, 1922 — 2 Sheets-Sheet 2
1,463,828
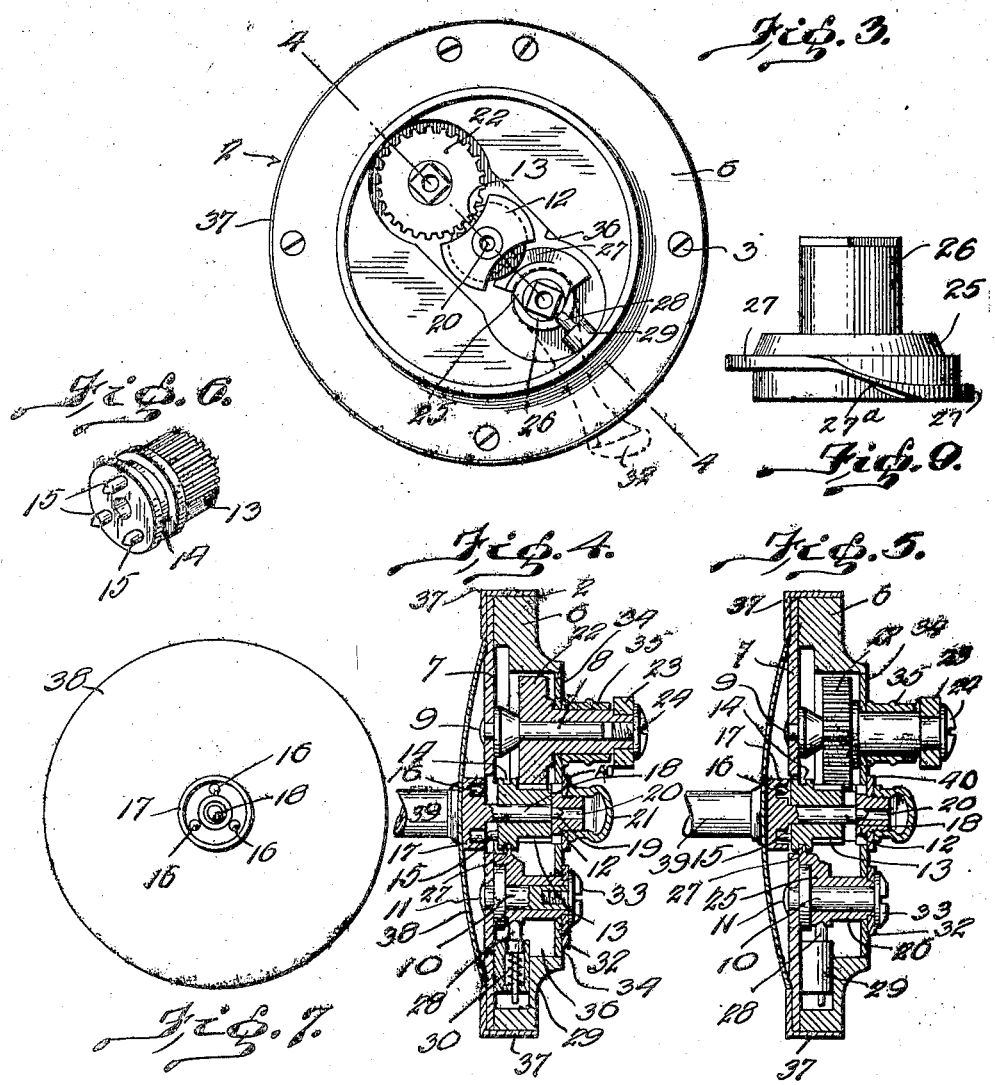

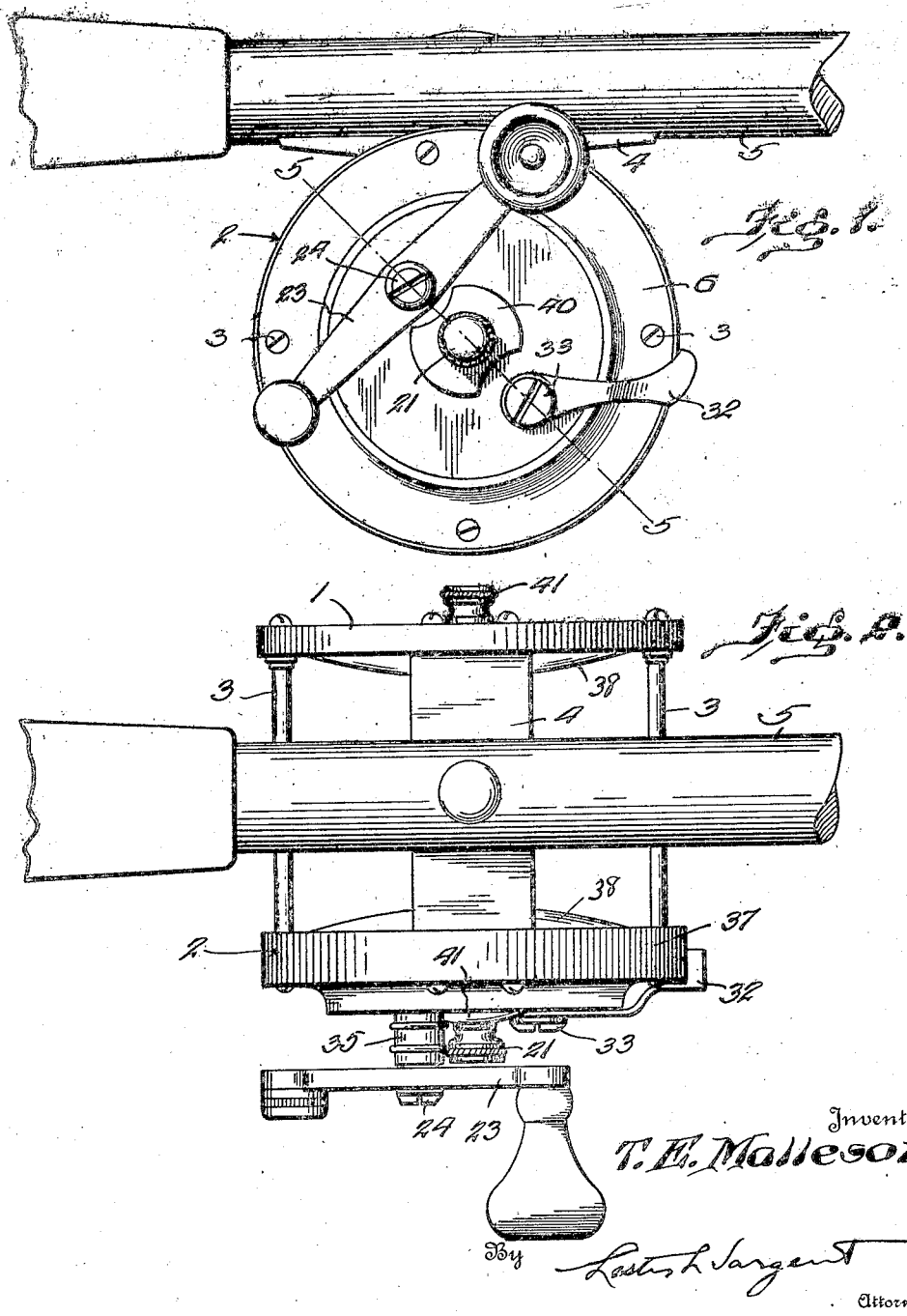

Patented Aug. 7, 1923.

1,463,828

UNITED STATES PATENT OFFICE.

THOMAS E. MALLESON, OF BROOKLYN, NEW YORK, ASSIGNOR TO MONTAGUE CITY ROD COMPANY, OF MONTAGUE CITY, MASSACHUSETTS.

FISHING REEL.

Application filed May 9, 1922. Serial No. 559,574.

*To all whom it may concern:*

Be it known that I, THOMAS E. MALLESON, a citizen of the United States, residing at Brooklyn, in the county of Kings and State of New York, have invented a new and useful Fishing Reel, of which the following is a specification.

The object of my invention is to provide an efficient and novel brake means for a fishing reel, including a novel cam construction; and to provide a novel combination and arrangement of parts and for other objects, as hereinafter set forth.

I attain the objects of my invention by the mechanism illustrated in the accompanying drawings, in which—

Figure 1 is a side elevation of my reel applied to a fishing rod;

Fig. 2 is a top plan of same;

Fig. 3 is a side elevation of the reel with the cover plate and reel crank removed; the cam operating lever 32 being shown in a reverse position from that illustrated in Fig. 1, in position to apply the brake;

Fig. 4 is a transverse section on line 4—4 of Fig. 3;

Fig. 5 is a section on line 5—5 of Fig. 1;

Fig. 6 is a detail perspective view of the clutch gear;

Fig. 7 is an end view of the reel spool showing the companion clutch elements;

Fig. 8 is a detail rear view of the operating cam; and

Fig. 9 is a detail face view of the operating cam.

Referring to the accompanying drawings, I provide a reel 39 rotatably mounted between suitable sides 1 and 2. The sides 1 and 2 are each provided with a metal cover ring 37, L-shaped in cross section. Sides 1 and 2 are held in a fixed spaced relation by suitable cross rods 3. The mechanism for operating the reel is contained within a suitable casing ring or disk 6. Rigidly attached to the sides 1 and 2 is a suitable bearing plate 4, by means of which the reel is attached to the fishing rod 5, as shown in Fig. 1. Mounted between the cover ring 37 and the casing ring or disk 6 I provide a centrally channeled disk 7 on which is mounted a pin 8 attached by rivet 9, said pin forming a bearing member for the drive gear 22. The drive gear 22 is rigidly attached to the operating or hand crank 23 by suitable means such as the screw 24, as shown in Fig. 4.

I provide a suitable oil cup 21 in threaded engagement on pinion bearing 12 and abutting against the small washer plate 40, as shown in Fig. 4. I provide a spacing sleeve 35 interposed between the operating crank 23 and cover plate 34, as shown in Fig. 4. The bearing 18 is provided with a suitable reduced projecting end 19 which rotatably seats in the channel 20 of the small bearing 12. I provide a suitable drive gear 22 which meshes with and drives a suitable pinion 13. Pinion 13 is movable longitudinally on the bearing 18, which member is an extension of and integral with reel 39.

I provide on the end of pinion 13 an annular groove 14 to receive cam flange. I also provide a plurality of spaced projecting clutch pins 15 adapted to releasably engage corresponding projections 16 on the annularly grooved pinion 17 of reel 39, as shown in Figs. 4 and 5. Engageable in the annular groove 14 of pinion 13 is a suitable cam flange 27 which is integral with a suitable cam 25. Cam 25 which has an extension 26 is longitudinally channeled. Cam 25 is mounted on a bearing 10. Bearing 10 in turn is mounted, by means of rivets 11 on disk 7, and by means of screw 33 on cover plate 34, as shown in Figs. 4 and 5. Cam 25 is disposed in a suitable chamber 36 in casing ring 6, as shown in Fig. 4.

I provide a retaining plunger 28 slidably mounted in a suitable housing 29 and resiliently held by a spring 30 in operative engagement with the surface of cam 25, as shown in Figs. 4 and 5. The rear portion of cam 25 is provided with spaced sockets 31 to receive the plunger 28. Mounted on the recessed end of cam extension 26 is the cam operated lever 32 which is rigidly fastened to the extension by the screw 33, as shown in Figs. 1, 2, 4 and 5.

When the crank 23 is turned it rotates gear 22 which in turn drives pinion 13. When pinion 13 is in the position shown in Fig. 5 its projections 15 engage the projections 16 of reel 39 and cause the reel 39 and sides 38 to rotate. This is the method of winding the line on the reel.

When it is desired to have the reel run free in order to play out the line, the cam operating lever 32 is shifted from the position shown in Fig. 1 to the dotted line position shown in Fig. 3, thereby rotating screw 33, bearing 10, cam 25 and cam flange 27. As the cam flange 27 slidably engages in the groove 14 of pinion 13, it forces the pinion, which is longitudinally slidable on bearing 18, away from the end of the reel 39, thus moving the projections 15 into a position in which they will not engage the projections 16 of the reel spool, thus allowing the reel to rotate freely on its bearings but without disengaging pinion 13 from its meshing engagement with drive gear 22 in either of its extreme positions.

What I claim is:

1. In a fishing reel, the combination of a reel having projections on one end, an annularly grooved pinion having projections on one end and movable into and out of position to engage with the projections on the reel, a rotatable cam having a cam flange slidably engaging said pinion and adapted to move said pinion to an extent only sufficient to disengage its projections from the projections on the reel, and a cam operating lever.

2. In a fishing reel, the combination of a cam having a semi-circular cam flange, a pinion having an annular groove in which said cam flange is rotatably engageable, a reel having an end bearing pin on which the pinion is longitudinally slidable toward and away from the end of the reel, means for operatively engaging the pinion and reel when the pinion is slid into proximity to the end of the reel, a cam lever affixed to the cam, and means for driving the pinion.

3. In a fishing reel, the combination of a cam having a semi-circular cam flange, a pinion having an annular groove in which said cam flange is rotatably engageable, a reel having an end bearing pin on which the pinion is longitudinally slidable toward and away from the end of the reel, means for operatively engaging the pinion and reel when the pinion is slid into proximity to the end of the reel, a cam lever affixed to the cam, a gear engaging the pinion, said gear having an extension, and an operating crank affixed to the end of said extension the last named gear being of relatively larger size than the pinion whereby to increase the speed of operation of the reel.

4. In a fishing reel, as a new article of manufacture, a cam having a cam flange, said cam also having an extension and a cam operating lever affixed thereto, said lever being manually operable.

5. In a fishing reel, as a new article of manufacture, a pinion having an annular grooved portion at one end thereof, and having projections on the end of said portion, said projections extending longitudinally relative to the teeth of the pinion, the pinion having a central longitudinal channel for mounting the article.

6. In a fishing reel, the combination of a reel having a bearing pin extension, said member having a reduced end to form a bearing member, a bearing in which said reduced end is rotatably mounted, a pinion longitudinally slidable on the enlarged portion of the bearing pin, means on the end of the reel and on the end of the pinion whereby said members may be engaged and disengaged to cause the pinion to rotate the reel or to allow it to run free, a gear operatively engaging and driving the pinion, a crank for driving said gear, a cam having a cam flange operatively engaging a grooved portion of the pinion, and a cam lever affixed to the cam member.

7. In a fishing reel, the combination of a reel having a bearing pin extension, said member having a reduced end to form a bearing member, a bearing in which said reduced end is rotatably mounted, a pinion longitudinally slidable on the enlarged portion of the bearing pin, means on the end of the reel and on the end of the pinion whereby said members may be engaged and disengaged to cause the pinion to rotate the reel or to allow it to run free, a gear operatively engaging and driving the pinion, a crank for driving said gear, a cam having a cam flange operatively engaging a grooved portion of the pinion, a cam lever affixed to the cam member, the cam member having spaced openings in its rear portion and a resiliently mounted pin releasably engaging said openings to releasably hold the cam in either of its two extreme positions, one for operating the reel and the other for allowing it to run free.

THOMAS E. MALLESON